(Model.)

A. C. EMMICK.
AXLE SKEIN.

No. 282,289.        Patented July 31, 1883.

WITNESSES:          INVENTOR:
Donn Twitchell      A. C. Emmick
C. Sedgwick     BY  Munn & Co.
                    ATTORNEYS.

N. PETERS. Photo-Lithographer. Washington, D. C.

United States Patent Office.

ANDREW C. EMMICK, OF COLUMBUS, OHIO, ASSIGNOR TO HIMSELF AND EDMUND N. HATCHER, OF SAME PLACE.

AXLE-SKEIN.

SPECIFICATION forming part of Letters Patent No. 282,289, dated July 31, 1883.

Application filed March 21, 1883. (Model.)

*To all whom it may concern:*

Be it known that I, ANDREW C. EMMICK, of Columbus, Franklin county, in the State of Ohio, have invented an Improvement in Hollow Plugs for Axle-Skeins, of which the following is a specification.

The object of the invention is to make the interior of the hollow plugs which are welded on the inside of axle-skeins of the peculiar shape and for the reasons hereinafter specified.

Figure 1:
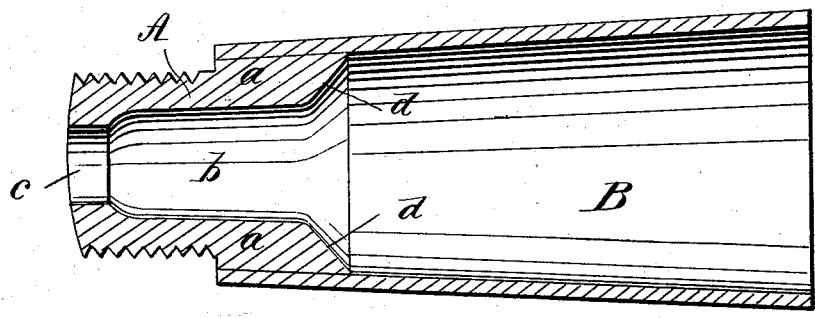
Figure 2:
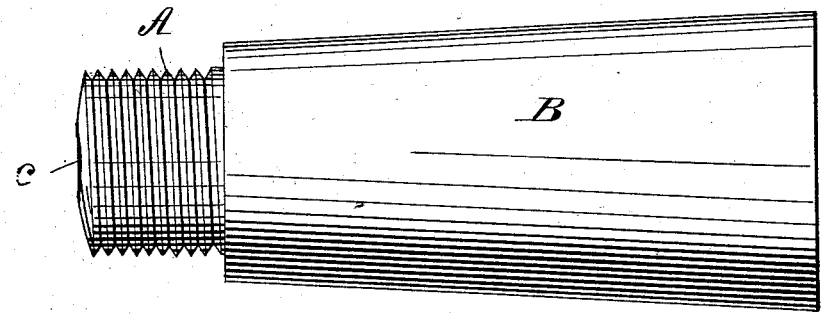
Figure 3:
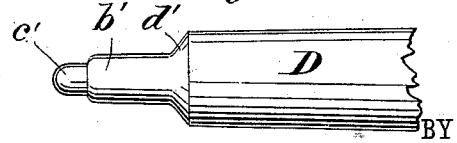

Figure 1 of the drawings is a longitudinal section of an axle-skein and its hollow plug, the latter being constructed internally according to my invention. Fig. 2 is a side elevation of the axle-skein; and Fig. 3 is a view of the male welding die, of a form adapted to shape the interior of my plug during the welding operation.

B represents the axle-skein, and A my improved hollow plug. The latter has the cavity $b$, the smaller end hole, $c$, and the inward flare, $d$.

The male die D, in producing the weld to the axle-skein, also makes the cavity with its working-face, $b'$, the hole $c$, with its end $c'$, and the flare $d$, with its sloping shoulder $d'$. By making the end hole, $c$, small compared to the cavity $b$, I am enabled to run a lag-screw from the point of the skein to the axle, so as to exclude all air and moisture.

Having thus described all that is necessary to a full understanding of my invention, what I claim as new is—

The hollow plug of an axle-skein, made with the cavity $b$ and an end hole, $c$, made smaller than said cavity to receive a lag-screw, for the purpose specified.

ANDREW C. EMMICK.

Witnesses:
FRED F. CURTIS,
JOSEPH F. DAVIDSON.